US012728746B2

(12) United States Patent
Zeng

(10) Patent No.: US 12,728,746 B2
(45) Date of Patent: Sep. 8, 2026

(54) LOADING AND UNLOADING PLATFORM FOR NEW ENERGY LOGISTICS VEHICLE AND LOADING AND UNLOADING SYSTEM

(71) Applicant: BEIJING JINGDONG ZHENSHI INFORMATION TECHNOLOGY CO., LTD., Beijing (CN)

(72) Inventor: Meiling Zeng, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 737 days.

(21) Appl. No.: 18/248,787

(22) PCT Filed: Sep. 3, 2021

(86) PCT No.: PCT/CN2021/116404
§ 371 (c)(1),
(2) Date: Apr. 12, 2023

(87) PCT Pub. No.: WO2022/088986
PCT Pub. Date: May 5, 2022

(65) Prior Publication Data

US 2023/0373329 A1 Nov. 23, 2023

(30) Foreign Application Priority Data

Nov. 2, 2020 (CN) ......................... 202022488185.9

(51) Int. Cl.
*B60L 53/31* (2019.01)
*B60L 53/14* (2019.01)
(Continued)

(52) U.S. Cl.
CPC ............... *B60L 53/31* (2019.02); *B60L 53/14* (2019.02); *B60L 53/37* (2019.02); *B60L 53/65* (2019.02); *B60L 2200/36* (2013.01)

(58) Field of Classification Search
CPC .......... B60L 53/31; B60L 53/14; B60L 53/37; B60L 53/65
See application file for complete search history.

(56) References Cited

U.S. PATENT DOCUMENTS

2009/0134558 A1 5/2009 Cowey
2014/0333261 A1 11/2014 Oh et al.
(Continued)

FOREIGN PATENT DOCUMENTS

CN 207467760 U 6/2018
CN 208021226 U 10/2018
(Continued)

OTHER PUBLICATIONS

"Communication with Supplementary European Search Report", EP Application No. 21884717.6, Sep. 19, 2024, 9 pp.
(Continued)

*Primary Examiner* — Robert Grant
(74) *Attorney, Agent, or Firm* — Myers Bigel, P.A.

(57) ABSTRACT

The present disclosure relates to a loading and unloading platform for a logistics vehicle, including a loading and unloading platform having a platform main body, an accommodating chamber arranged within the platform main body, and a loading and unloading docking area provided at a side of the platform main body; and a charging apparatus having a charging host and a charging pile, the charging host arranged within the accommodating chamber, the charging pile arranged in the loading and unloading docking area, and the charging pile configured to be electrically connected with a logistics vehicle to charge the same.

18 Claims, 5 Drawing Sheets

(51) Int. Cl.

| | |
|---|---|
| ***B60L 53/37*** | (2019.01) |
| ***B60L 53/65*** | (2019.01) |

(56) References Cited

U.S. PATENT DOCUMENTS

| | | | | |
|---|---|---|---|---|
| 2018/0001777 | A1 | 1/2018 | Kilic | |
| 2019/0202064 | A1* | 7/2019 | Wolff | A47L 9/2873 |
| 2020/0101856 | A1 | 4/2020 | Klausner et al. | |
| 2021/0086601 | A1* | 3/2021 | Choi | B60K 1/04 |

FOREIGN PATENT DOCUMENTS

| | | | |
|---|---|---|---|
| CN | 111361438 | A | 7/2020 |
| CN | 211731103 | U | 10/2020 |
| CN | 213923265 | U | 8/2021 |
| EP | 3243691 | A1 | 11/2017 |

OTHER PUBLICATIONS

Elonroad, “Elonroad EV auto charger”, Retrieved from the Internet: URL:https://www.youtube.com/watch?v=tZYPPfaA9zE [retrieved on Aug. 28, 2024], Oct. 7, 2020, 2 pp.

“International Search Report and Written Opinion of the International Searching Authority with English language translation”, International Application No. PCT/CN2021/116404, Nov. 17, 2021, 16 pp.

* cited by examiner

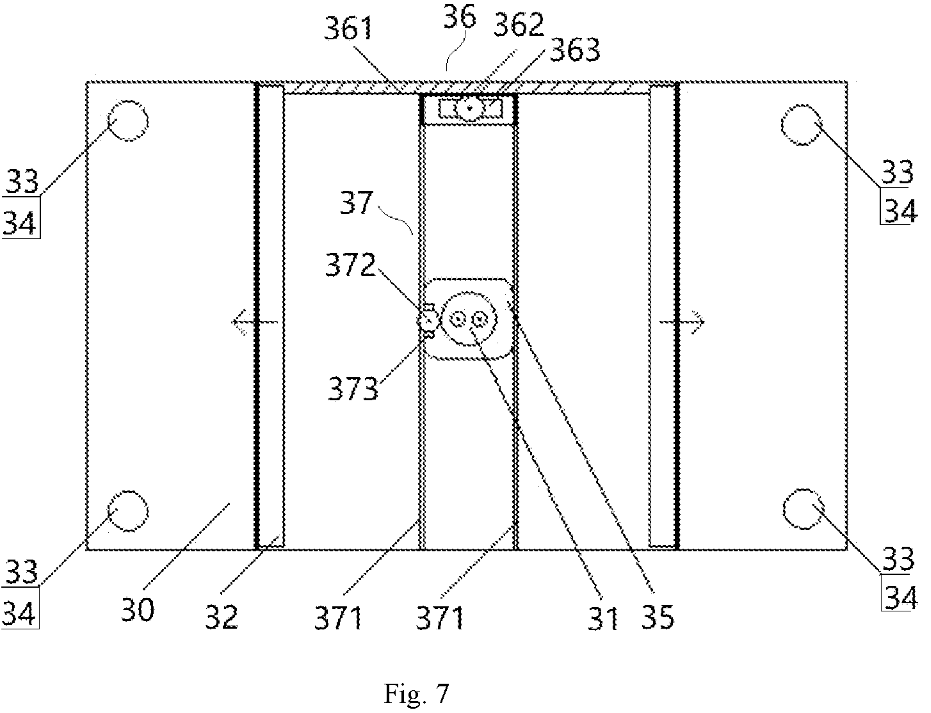
Fig. 7
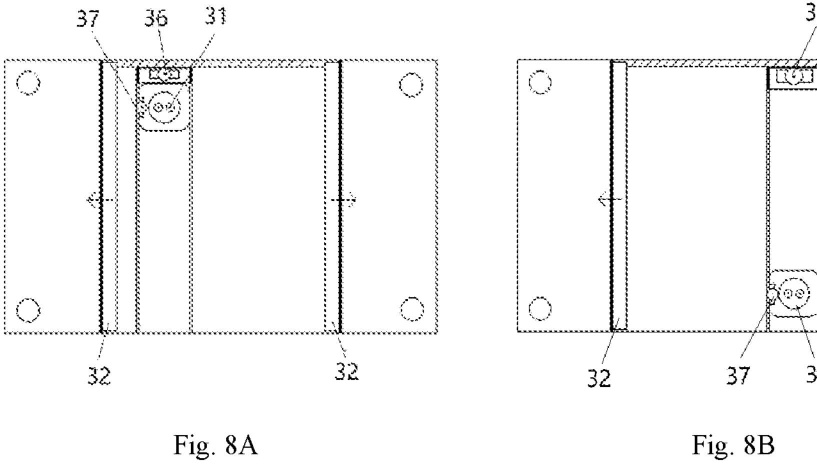
Fig. 8A
Fig. 8B

LOADING AND UNLOADING PLATFORM FOR NEW ENERGY LOGISTICS VEHICLE AND LOADING AND UNLOADING SYSTEM

CROSS-REFERENCE TO RELATED APPLICATION

The present application is a U.S. National Stage Application under 35 U.S.C. § 371 of International Patent Application No. PCT/CN2021/116404, filed on Sep. 3, 2021, which itself is based on and claims priority to Chinese Patent Application No. 202022488185.9, filed on Nov. 2, 2020, the disclosures of both of which are hereby incorporated herein by reference in their entireties.

TECHNICAL FIELD

The present disclosure relates to the field of logistics technology, in particular to a loading and unloading platform for a new energy logistics vehicle and a loading and unloading system.

BACKGROUND

During a loading or unloading process, if charging is needed, a new energy logistics vehicle has to move to a fixed charging pile in a particular charging area for charging. After charging is completed, the vehicle is driven to a designated loading and unloading platform for a loading or unloading operation.

In a current charging method, a charging area for a new energy logistics vehicle is separated from a loading and unloading area of a warehouse, i.e. a charging pile and a loading and unloading platform are completely separated from each other and are in different areas, such that a new energy logistics vehicle needs to move to a charging area for charging first, and after the charging is completed, move to a designated loading and unloading area for loading. For example, DC fast charging is completed after an average of 2-3 hours, and depending on a vehicle loading capacity, it takes an average of 1-3 hours to load or unload a truck. For example, a new energy logistics vehicle needs to be charged for 3 hours and then be loaded or unloaded for 3 hours, totaling 6 hours, so the vehicle is used for a long time.

SUMMARY

An aspect of embodiments of the present disclosure provides a loading and unloading platform for a new energy logistics vehicle, including:

- a loading and unloading platform, including a platform main body, an accommodating chamber being arranged within the platform main body, and a loading and unloading docking area being provided at a side of the platform main body; and
- a charging apparatus, including a charging host and a charging pile, the charging host being arranged within the accommodating chamber, the charging pile being arranged in the loading and unloading docking area, and the charging pile being configured to be electrically connected with a logistics vehicle to charge the same.

In some embodiments, the accommodating chamber has an opening for picking up and placing the charging host, the accommodating chamber has an opening for picking up and placing the charging host, the opening being oriented towards the charging pile.

In some embodiments, the loading and unloading platform further includes a heat dissipation window, the heat dissipation window at least partially covering the opening, and the heat dissipation window being provided with a vent.

In some embodiments, the loading and unloading platform further includes at least two anti-collision components, which are arranged on a side of the platform main body facing the loading and unloading docking area and are located on two sides transversely of the opening, respectively.

In some embodiments, the loading and unloading platform further includes a parking platform, the parking platform being located on a side of the platform main body, the loading and unloading docking area being located on the parking platform, the charging pile being arranged on the parking platform and adjacent to the platform main body.

In some embodiments, on two sides transversely of the loading and unloading docking area, the parking platform is provided with guide lines, which are configured to provide parking guidance to the logistics vehicle.

In some embodiments, the charging pile includes: a first charging interface and a protective cover, the protective cover being configured to be in an open state when the logistics vehicle needs to be charged and in a closed state after charging is completed.

In some embodiments, the charging pile further includes: a photographing device configured to photograph a vehicle body image of the logistics vehicle; and

- the loading and unloading platform for a new energy logistics vehicle further includes a controller, which is electrically connected to the photographing device and configured to analyze the image photographed by the photographing device, and identify docking in place of the logistics vehicle and positioning of the second charging interface of the logistics vehicle.

In some embodiments, the charging pile includes a first sensing component configured to identify a second sensing component to read at least one of a model, positioning information and a height position of the second charging interface of the logistics vehicle.

In some embodiments, the charging pile includes: a first charging interface, a first position adjustment mechanism and a second position adjustment mechanism, the first position adjustment mechanism and the second position adjustment mechanism being configured to adjust a transverse position and a longitudinal position, in a horizontal plane, of the first charging interface, respectively, so that the first charging interface is aligned in the horizontal plane with the second charging interface of the logistics vehicle.

In some embodiments, the first position adjustment mechanism includes: a first slide rail, a first power component and a first drive wheel, the first slide rail being arranged transversely, and the first power component being configured to drive the first drive wheel to roll along the first slide rail, so that the first charging interface moves transversely; and/or

- the second position adjustment mechanism includes: a second slide rail, a second power component and a second drive wheel, the second slide rail being arranged longitudinally, and the second power component being configured to drive the second drive wheel to roll along the second slide rail, so that the second charging interface moves longitudinally.

In some embodiments, the charging pile includes: a first charging interface and a height adjustment mechanism, the height adjustment mechanism being configured to adjust the height of the first charging interface, so that when charging is needed, the first charging interface ascends to a height where the second charging interface of the logistics vehicle is located and comes into engagement with the second charging interface, and after charging is stopped, the first charging interface descends and retracts.

In some embodiments, the height adjustment mechanism includes a vertically arranged telescopic sleeve and a linear drive component, the linear drive component being configured to drive a topmost sleeve of the telescopic sleeve to ascend and descend, and the first charging interface being arranged on the topmost sleeve.

In some embodiments, the charging pile further includes a photographing device configured to photograph engagement of the first charging interface;

the first charging interface is provided with a first mark configured to mark an engagement depth of the first charging interface; and the height adjustment mechanism is configured to adjust the height of the first charging interface according to the image acquired by the photographing device, so that the engagement depth reaches the first mark.

In some embodiments, the charging pile includes: a first charging interface, a photographing device and a rotation adjustment mechanism;

the first charging interface is provided with a second mark configured to mark an engagement angle of the first charging interface; the photographing device is configured to photograph engagement of the first charging interface; and the rotation adjustment mechanism is configured to rotate the first charging interface so that the engagement angle reaches the second mark.

In some embodiments, the charging pile further includes a base arranged below the first charging interface, teeth being provided on at least part of an outer periphery of the base, and the rotation adjustment mechanism includes a power component and a gear, the gear being engaged with the teeth of the base, and the power component being configured to drive the gear to rotate the base and the first charging interface.

An aspect of embodiments of the present disclosure provides a loading and unloading system, including:

a logistics vehicle provided with a battery thereon; and the loading and unloading platform for a new energy logistics vehicle of the above embodiment, configured to charge the battery and to load and unload the logistics vehicle.

In some embodiments, the charging pile includes a first sensing component, and the logistics vehicle is provided with a second charging interface and a second sensing component, the second charging interface being located at the bottom of a rear area of a vehicle body; and the first sensing component is configured to identify the second sensing component, so as to read at least one of a model, positioning information and a height position of the second charging interface of the logistics vehicle.

BRIEF DESCRIPTION OF THE DRAWINGS

Drawings illustrated herein are used for providing further understanding of the present disclosure and form part of the present application, and illustrative embodiments of the present disclosure and description thereof are intended for explaining instead of improperly limiting the present disclosure. In the drawings:

FIG. 7 is a schematic diagram of the protective covers of the charging pile in an open state;

FIGS. 8A and 8B are schematic state diagrams of a first charging interface moving to a first position and a second position, respectively;

REFERENCE NUMERALS

Figure 1:
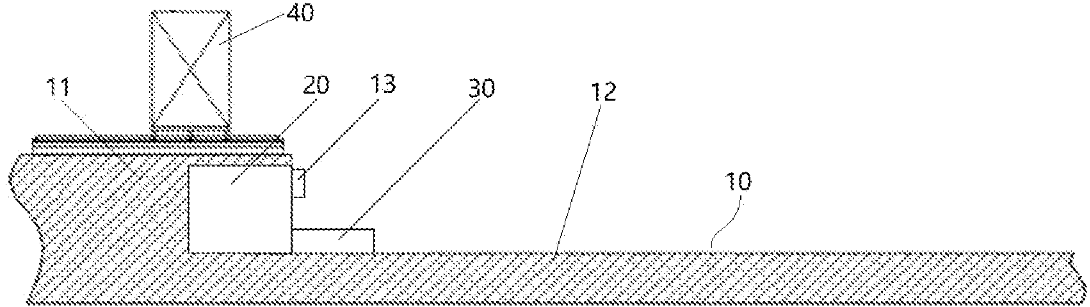
FIG. 1 is a side view of some embodiments of a loading and unloading platform for a new energy logistics vehicle in the present disclosure.

- 10, loading and unloading platform; 11, platform main body; 111, accommodating chamber; 112, opening; 12, parking platform; 13, anti-collision component; 14, guide line; 15, heat dissipation window;
- 20, charging host;
- 30, charging pile; 301, slot; 31, first charging interface; 311, first mark; 312, second mark; 32, protective cover; 33, photographing device; 34, first sensing component; 35, base; 351, tooth; 36, first position adjustment mechanism; 361, first slide rail; 362, first drive wheel; 363, first power component; 37, second position adjustment mechanism; 371, second slide rail; 372, second drive wheel; 373, second power component; 38, height adjustment mechanism; 381, telescopic sleeve; 382, linear drive component; 383, hydraulic control component; 39, rotation adjustment mechanism; 391, power component; 392, gear;
- 40, item;
- 50, logistics vehicle; 51, second charging interface; 52, battery; 53, vehicle frame;
- S, loading and unloading docking area.

DETAILED DESCRIPTION

This present disclosure is described in detail below. In the following paragraphs, different aspects of the embodiments are defined in more detail. The aspects so defined may be combined with any other aspect or aspects, unless stated expressly to the contrary. In particular, any feature considered to be preferred or advantageous may be combined with one or more other features considered to be preferred or advantageous.

The terms “first”, “second” and the like appearing in the present disclosure are only for convenience of description to distinguish different components with the same name, and do not indicate a precedence or primary-secondary relationship.

In addition, when an element is described as "being" "on" another element, the element may be directly on the another element, or may be indirectly on the another element with one or more intermediate elements interposed there between. Furthermore, when an element is described as "connected" to another element, the element may be directly connected to the another element, or may be indirectly connected to the another element with one or more intermediate elements interposed there between. In the following, like reference numerals denote like elements.

The present disclosure uses the description of orientation or location relations denoted by the terms "upper", "lower", "top", "bottom", "front", "rear", "inner" and "outer", etc., only for the convenience of describing the present disclosure, rather than indicating or implying that the denoted devices necessarily have specific orientations and are constructed and operated in specific orientations, and thus should not be construed as limiting the protection scope of the present disclosure. The term "transverse" mentioned in the following embodiments is consistent with a left-right direction of a logistics vehicle, the term "longitudinal" is consistent with a front-rear direction of the logistics vehicle, and the term "height direction" is consistent with an up-down direction.

Embodiments of the present disclosure provide a loading and unloading platform for a new energy logistics vehicle and a loading and unloading system, which can improve the efficiency of a whole loading and unloading process.

The loading and unloading platform for a new energy logistics vehicle of embodiments of the present disclosure combines the loading and unloading platform and the charging apparatus. Such an integrated arrangement allows the logistics vehicle to perform loading and unloading during charging, thereby greatly reducing the total operating time of a loading and unloading process, which can improve the time utilization ratio of the logistics vehicle and reduce waiting time, can save the total time spent on loading and unloading, and can also reduce the length of time the logistics vehicle occupies a space.

As shown in FIGS. 1 to 11, the present disclosure provides a loading and unloading platform for a new energy logistics vehicle, hereinafter referred to as a "loading and unloading platform," which in some embodiments includes: a loading and unloading platform 10 and a charging apparatus.

The loading and unloading platform 10 is configured to load and unload the logistics vehicle 50, and the loading and unloading platform 10 includes a platform main body 11, an accommodating chamber 111 being arranged within the platform main body 11; and the height of the platform main body 11 is same as the height of the bottom of the compartment of the logistics vehicle 50, and items 40 such as containers can be placed on the platform main body 11 so as to be loaded into the compartment, or the items 40 in the compartment can be unloaded onto the platform main body 11.

Figure 4:
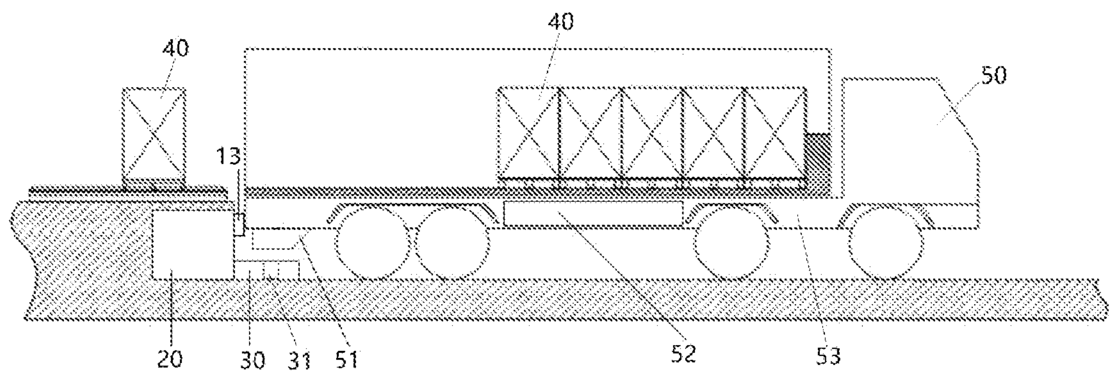
FIG. 4 is a side view of some embodiments of the loading and unloading system in the present disclosure in an uncharged state.
Figure 5:
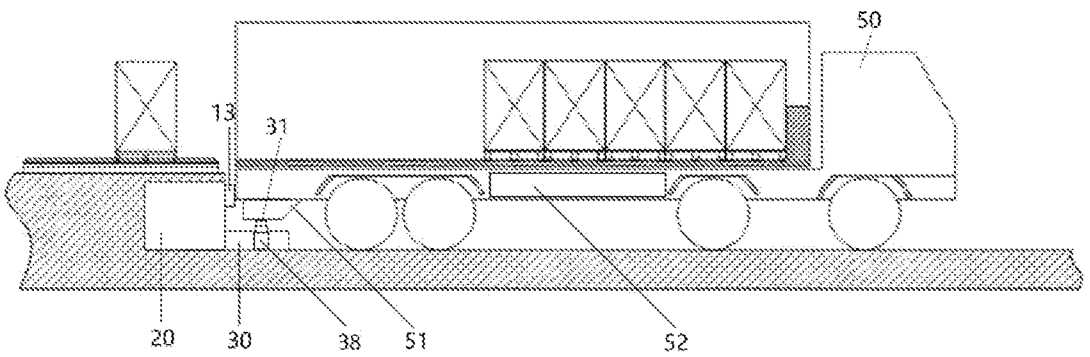
FIG. 5 is a side view of some embodiments of the loading and unloading system in the present disclosure in a charged state.

As shown in FIGS. 4 and 5, the charging apparatus is configured to charge a battery 52 on the logistics vehicle 50, and the battery 52 can be arranged in a middle area longitudinally of a vehicle frame 53. The charging apparatus includes a charging host 20 and a charging pile 30. The charging host 20 is arranged within the accommodating chamber 111, and can be connected to an external power supply by means of a pre-buried pipeline, and the top of the accommodating chamber 111 can be provided with a load-bearing plate; and the charging pile 30 is arranged in the loading and unloading docking area S at a side of the platform main body 11, and the charging pile 30 is configured to be electrically connected with the logistics vehicle 50 to charge the same. The loading and unloading docking area S refers to an area where the logistics vehicle 50 is docked when performing a loading and unloading task; and the logistics vehicle 50 can simultaneously perform loading and unloading and charging when it is located in the loading and unloading docking area S.

Specifically, the charging pile 30 can be provided with a first charging interface 31, and the logistics vehicle 50 is provided with a second charging interface 51, the charging host 20 being connected to the charging pile 30 by means of a cable and supplies power to the charging pile 30, and the first charging interface 31 of the charging pile 30 being connected to the second charging interface 51 on the logistics vehicle 50 to charge the battery 52. An apparatus main body of the charging pile 30 can be made of metal or engineering plastic or other anti-corrosion and anti-rust material.

The loading and unloading platform of this embodiment combines the loading and unloading platform 10 and the charging apparatus, without the need to provide a charging area separately. Such an integrated arrangement allows the logistics vehicle 50 to perform loading/unloading during charging, thereby greatly reducing the total operating time of a loading/unloading process, which can improve the time utilization ratio of the logistics vehicle and reduce waiting time, can save the total time spent on loading and unloading, and can also reduce the length of time the logistics vehicle occupies a space.

In addition, as the charging host 20 is embedded in the platform main body 11, it does not need additional space occupation and is conducive to protecting the charging host 20; and as the charging pile 30 is arranged in the loading and unloading docking area S, the logistics vehicle 50 can be conveniently connected to the charging pile 30 for charging when it is located in the loading and unloading docking area S and performs a loading and unloading task.

Figure 2:
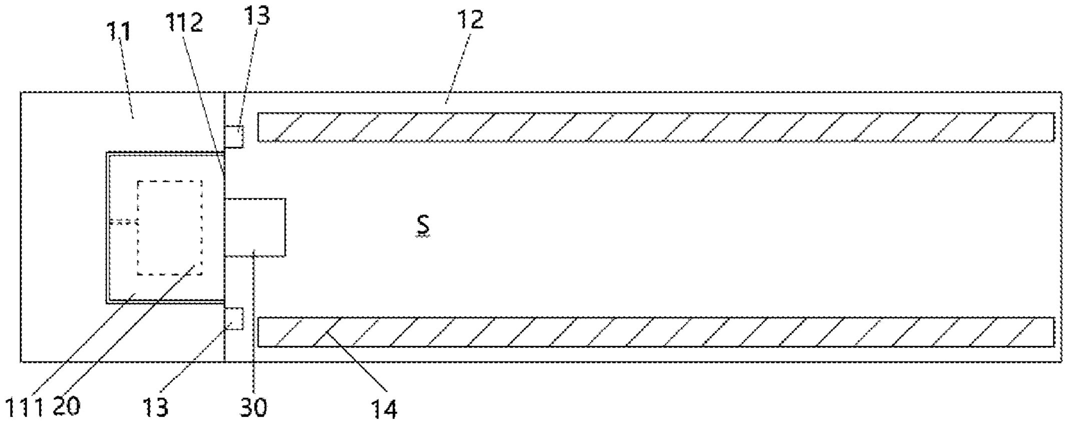
FIG. 2 is a top view of some embodiments of the loading and unloading platform for a new energy logistics vehicle in the present disclosure.

As in FIGS. 1 and 2, the accommodating chamber 111 has an opening 112. The opening 112 faces the charging pile 30. This structure allows the charging host 20 to be conveniently placed into the accommodating chamber 111 or removed from the accommodating chamber 111, which facilitates maintenance; moreover, the opening 112 facing the charging pile 30 facilitates the charging host 20 to be connected to the charging pile 30 by means of a cable.

Figure 3:
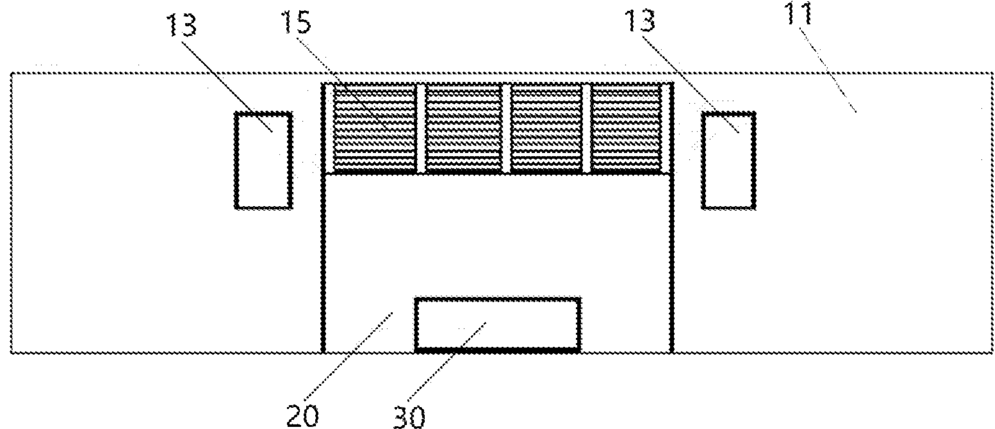
FIG. 3 is a front view of some embodiments of the loading and unloading platform for a new energy logistics vehicle in the present disclosure.

As shown in FIG. 3, the loading and unloading platform further includes a heat dissipation window 15. The heat dissipation window 15 at least partially covers the opening 112, and the heat dissipation window 15 is provided with a vent, such as a louver or the like. In some embodiments, the heat dissipation window 15 is arranged in an upper area of the opening 112, and the heat dissipation window 15 can cover the opening 112 in a transverse direction. This embodiment enables the charging host 20 embedded in the platform main body 11 to be in a good heat dissipation condition.

As shown in FIGS. 1 to 3, the loading and unloading platform further includes at least two anti-collision components 13, which are arranged on a side of the platform main body 11 facing the loading and unloading docking area S and are located on two sides transversely of the opening 112, respectively. The anti-collision components 13 can be anti-collision rubber strips, rubber blocks, anti-collision posts, anti-collision marks, or the like.

In this embodiment, by providing the anti-collision components 13, the logistics vehicle 50 can be accurately positioned when it is parked in the loading and unloading docking area S by reversing, to prevent deviation or inaccurate parking position of the logistics vehicle 50, so that the first charging interface 31 is aligned with the second charging interface 51 to implement connection therewith; and it can also prevent the logistics vehicle 50 from colliding with the platform main body 11 when reversing to protect the logistics vehicle and the platform main body 11.

In some embodiments, the loading and unloading platform 10 further includes a parking platform 12. The parking platform 12 is located on a side of the platform main body 11; the loading and unloading docking area S is located on the parking platform 12; and the charging pile 30 is arranged on the parking platform 12 and adjacent to the platform main body 11.

In this embodiment, by providing the parking platform 12, the logistics vehicle 50 can be reversed more smoothly and parked accurately to improve the accuracy of parking positioning of the logistics vehicle 50, thereby being conducive to loading and unloading as well as the connection of the first charging interface 31 and the second charging interface 51 for charging. As shown in FIG. 4, in order to load items 40 into or unload items from the compartment, the logistics vehicle 50 needs to be reversed so as to approach the platform main body 11, and the second charging interface 51 is located in a rear area of the bottom of the vehicle frame 53, so the charging pile 30 is arranged on the parking platform 12 and adjacent to the platform main body 11 to facilitate the connection of the charging interfaces, and the position of the charging pile 30 can be set according to the position area of the second charging interface 51, for example the charging pile 30 being arranged adjacent to the platform main body 11.

As shown in FIG. 2, on two sides transversely of the loading and unloading docking area S, the parking platform 12 is provided with guide lines 14, which are configured to provide parking guidance to the logistics vehicle 50. The guide lines 14 can guide the logistics vehicle during reversing and docking to improve the accuracy of parking positioning of the logistics vehicle 50, thereby facilitating charging and loading and unloading tasks.

Figure 6:
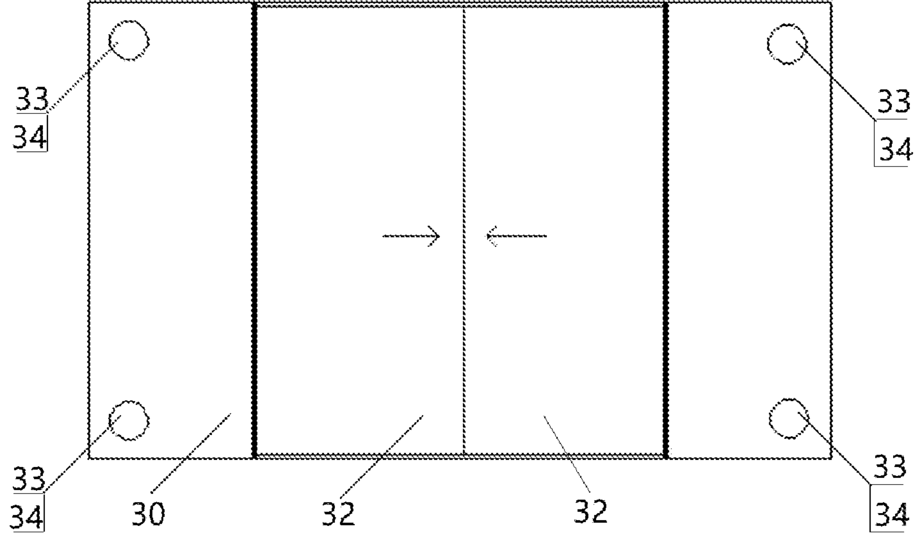
FIG. 6 is a mechanism is schematic diagram of protective covers of a charging pile in a closed state.

In some embodiments, as shown in FIGS. 6 and 7, the charging pile 30 includes: a first charging interface 31 and a protective cover 32, the protective cover 32 being configured to be in an open state when the logistics vehicle 50 needs to be charged and in a closed state after charging is completed. Specifically, two protective covers 32 are provided, and both protective covers 32 are transversely slidably arranged, and are configured to be opened when moving away from each other and be closed when moving closer to each other. This structure does not occupy additional space when the protective cover 32 is opened and closed, to avoid collision with the logistics vehicle 50. Optionally, the protective cover 32 can also be opened and closed by rotation.

As shown in FIG. 6, when charging is not needed, the protective covers 32 are in a closed state, and can achieve a dust-proof and rain-proof function to protect the charging pile 30 from damage; and as shown in FIG. 7, when the logistics vehicle 50 is detected to be docked in place and charging is needed, the protective covers 32 are automatically opened for charging.

In some embodiments, as shown in FIGS. 6 and 7, the charging pile 30 further includes: a photographing device 33 configured to photograph a vehicle body image of the logistics vehicle 50. The loading and unloading platform for a new energy logistics vehicle further includes a controller, which is electrically connected to the photographing device 33, and configured to analyze the image photographed by the photographing device 33 and identify docking in place of the logistics vehicle 50 and positioning of the second charging interface 51 of the logistics vehicle 50. If the logistics vehicle 50 is docked in place, then loading and unloading and charging tasks can be performed, and if it is not docked in place, information is fed back to a driver to continue adjustment; moreover, after docking in place, by acquiring the positioning of the second charging interface 51, the first charging interface 31 can be accurately adjusted to align with the second charging interface 51 so as to engage therewith.

Further, after it is determined from the image photographed by the photographing device 33 that the logistics vehicle is docked in place, the protective covers 32 can be opened by the controller.

This embodiment can obtain from the photographing device 33 the docking in place of the logistics vehicle 50 and the positioning of the second charging interface 51, so as to accurately adjust the docked position of the logistics vehicle 50 and align the first charging interface 31 with the second charging interface 51, thereby ensuring the reliability of performing the loading and unloading task and charging task, and being conducive to the implementation of automatic charging.

In some embodiments, as shown in FIGS. 6 and 7, the charging pile 30 includes a first sensing component 34 configured to identify a second sensing component on the logistics vehicle 50, so as to read at least one of a model, positioning information and a height position of the second charging interface 51 of the logistics vehicle 50. The second sensing component can be arranged around the second charging interface 51. For example, the first sensing component 34 and the second sensing component can perform sensing by radio frequency.

In this embodiment, the charging pile 30 can acquire a signal and position information of the second charging interface 51 by automatically sensing, so that the first charging interface 31 can be more accurately engaged with the second charging interface 51, and charging can be performed automatically and reliably.

As shown in FIG. 7, four groups of photographing devices 33 and first sensing components 34 can be provided, in the areas of four corners of the top of the charging pile 30, respectively, and located on outer sides of the protective covers 32. This configuration enables more accurate acquisition of information.

In some embodiments, as shown in FIG. 7, the charging pile 30 includes: a first charging interface 31, a first position adjustment mechanism 36 and a second position adjustment mechanism 37. The first position adjustment mechanism 36 and the second position adjustment mechanism 37 are configured to adjust a transverse position and a longitudinal position, in a horizontal plane, of the first charging interface 31, respectively, so that the first charging interface 31 is aligned in the horizontal plane with the second charging interface 51 of the logistics vehicle 50.

Figure 9:
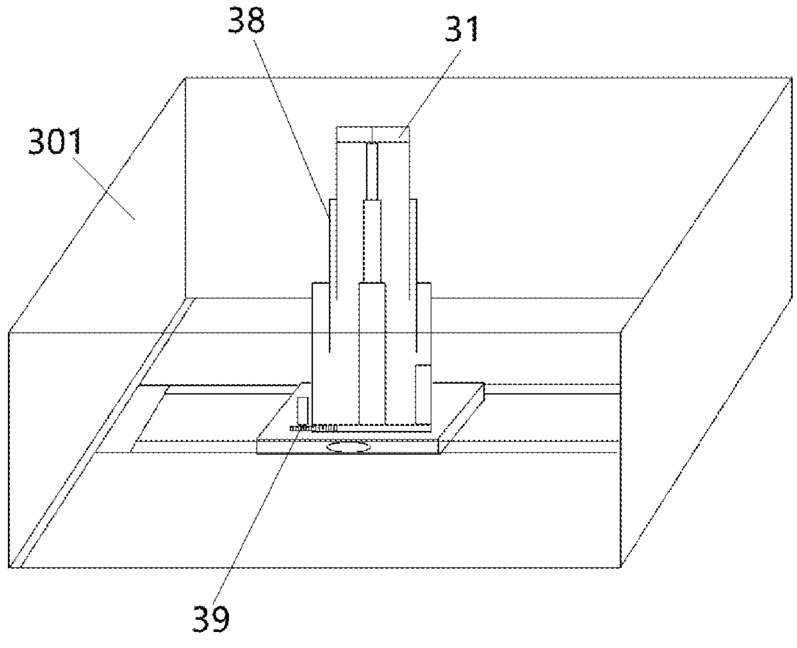
FIG. 9 is a schematic structural diagram of some embodiments of the charging pile.

In this embodiment, by means of the first position adjustment mechanism 36 and the second position adjustment mechanism 37, as shown in FIG. 9, in the horizontal plane of a slot 301 of the charging pile 30 after the protective covers 32 are opened, the position of the first charging interface 31 can be flexibly adjusted according to the position information of the second charging interface 51 acquired by the photographing device 33, so that the first charging interface 31 is aligned with the second charging interface 51, thereby facilitating the connection of the charging interfaces to perform charging.

As shown in FIG. 8A, the first charging interface 31 moves to an upper left corner area within the slot 301, and as shown in FIG. 8B, the first charging interface 31 moves to a lower right corner area within the slot 301; in this way, the first charging interface 31 can be adjusted in a large range within the slot 301.

In some embodiments, as shown in FIG. 7, the first position adjustment mechanism 36 includes: a first slide rail 361, a first power component 363 and a first drive wheel 362. The first slide rail 361 is arranged transversely, and the first slide rail 361 can be arranged at one or both sides longitudinally of the slot 301 therein. The first power component 363 is configured to drive the first drive wheel 362 to roll along the first slide rail 361 so that the first charging interface 31 moves transversely. The first power component 363 can be an electric machine or motor, or the like.

The second position adjustment mechanism 37 includes: a second slide rail 371, a second power component 373 and a second drive wheel 372. The second slide rail 371 is arranged longitudinally, and the second power component 373 is configured to drive the second drive wheel 372 to roll along the second slide rail 371 so that the second charging interface 51 moves longitudinally.

The first drive wheel 362 and the second drive wheel 372 can be made of rubber or other material with a large friction, to increase a rolling friction. In addition, power transmission can also be achieved by means of gears.

This embodiment is simple in structure, and enables the first charging interface 31 to be adjusted to any position within the slot 301 of the charging pile 30, such that flexible adjustment in a wide range can be achieved. After the first charging interface 31 is aligned with the second charging interface 51, fine adjustment can also be performed during engagement process according to the image photographed by the photographing device 33.

Specifically, as shown in FIG. 7, two second slide rails 371 are provided, and the two second slide rails 371 are arranged spaced apart transversely; a base 35 is arranged below the first charging interface 31, and the base 35 is arranged on the two second slide rails 371; and the second power component 373 drives the second drive wheel 372 to roll along the second slide rail 371, so that the base 35 and the first charging interface 31 can be caused to move longitudinally. The first drive wheel 362 is connected to ends of the two second slide rails 371, and the first power component 363 drives the first drive wheel 362 to roll along the first slide rail 361, to cause the two second slide rails 371 to move transversely, thereby causing the components base 35 and the first charging interface 31 to move transversely.

Optionally, the arrangement manners of the first slide rail 361 and the second slide rails 371 can also be interchanged.

Figure 10:
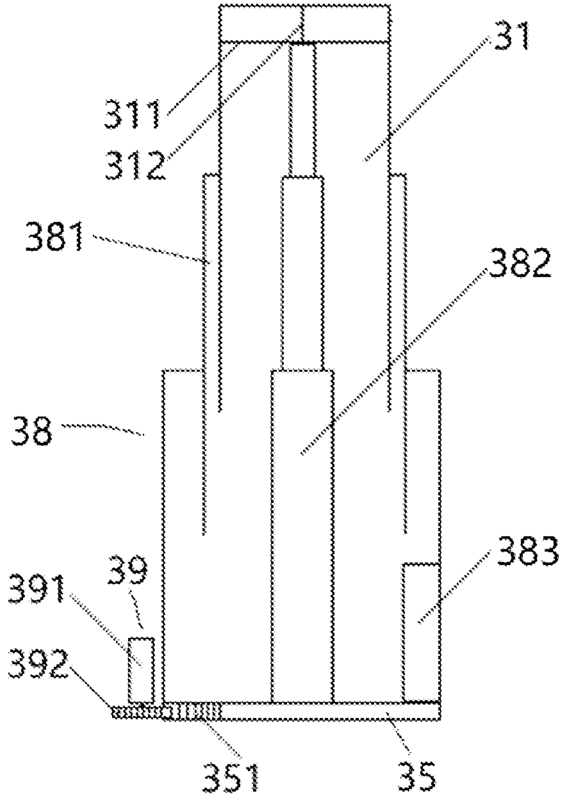
FIG. 10 is a schematic structural diagram of a height adjustment mechanism and a rotation adjustment mechanism.
Figure 11:
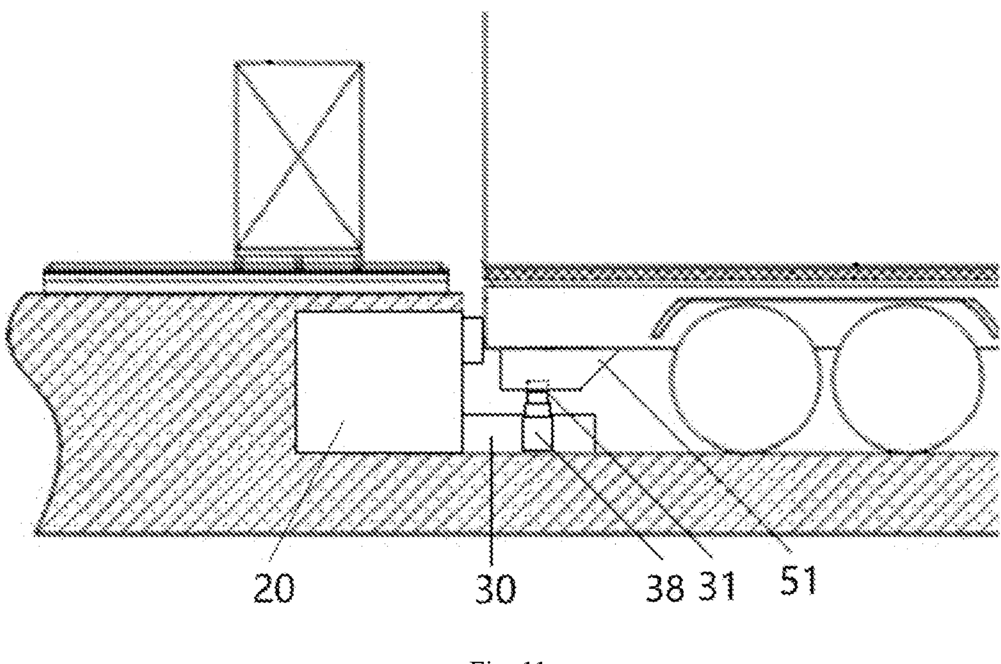
FIG. 11 is a schematic diagram of a state in which the first charging interface of the charging pile is engaged with a second charging interface of a logistics vehicle for charging.

In some embodiments, as shown in FIGS. 10 and 11, the charging pile 30 includes: a first charging interface 31 and a height adjustment mechanism 38. The height adjustment mechanism 38 is configured to adjust the height of the first charging interface 31, so that when charging is needed, the first charging interface 31 ascends to the height where the second charging interface 51 of the logistics vehicle 50 is located and comes into engagement with the second charging interface 51, and after charging is stopped, the first charging interface 31 descends and retracts.

In this embodiment, when charging is needed, the protective covers 32 can be opened, and the first charging interface 31 is raised to the height where the second charging interface 51 is located and engaged therewith, according to height information of the second charging interface 51 acquired by the first sensing components 34; and after charging is stopped, the first charging interface 31 is lowered and retracted into the slot 301 of the charging pile 30, and the protective cover 32 is closed. This configuration can not only meet the charging demand, but also prevent the first charging interface 31 from influencing other components and protect the first charging interface 31 when charging is not performed. In this way, the use reliability and life of the charging apparatus can be improved.

In some embodiments, as shown in FIG. 10, the height adjustment mechanism 38 includes a vertically arranged telescopic sleeve 381 and a linear drive component 382. The linear drive component 382 is configured to drive a topmost sleeve of the telescopic sleeve 381 to ascend and descend, and the first charging interface 31 is arranged on the topmost sleeve. The linear drive component 382 can be arranged within the sleeve to drive the first charging interface 31 to ascend and descend stably.

For example, the linear drive component 382 can be a hydraulic rod, and accordingly the base 35 can also be provided with a hydraulic control component 383 thereon, with a bottom end of the hydraulic rod being connected to the base 35 and a top end thereof being connected to the first charging interface, whereby the hydraulic rod can drive the first charging interface 31 to ascend and descend stably; optionally, the linear drive component 382 can also be an electric push rod.

In some embodiments, as shown in FIGS. 7 and 10, the charging pile 30 further includes photographing devices 33 configured to photograph engagement of the first charging interface 31. The first charging interface 31 is provided with a first mark 311 configured to mark an engagement depth of the first charging interface 31. The first mark 311 can be arranged around the first charging interface 31 so as to be photographed by the photographing devices 33 from various angles. The height adjustment mechanism 38 is configured to adjust the height of the first charging interface 31 according to images acquired by the photographing devices 33, so that the engagement depth reaches the first mark 311.

In this embodiment, by providing the first mark 311, the first charging interface 31 and the second charging interface 51 can automatically reach a preset engagement depth with the aid of the photographing devices 33, so as to ensure reliable connection and improve charging reliability.

In some embodiments, the charging pile 30 includes: a first charging interface 31, a photographing device 33 and a rotation adjustment mechanism 39. The first charging interface 31 is provided with a second mark 312 configured to mark an engagement angle of the first charging interface 31, and the second mark 312 can be arranged vertically on an outer periphery of the first charging interface 31; the photographing device 33 is configured to photograph engagement of the first charging interface 31; and the rotation adjustment mechanism 39 is configured to rotate the first charging interface 31 so that the engagement angle reaches the second mark 312.

In this embodiment, by providing the second mark 312, the first charging interface 31 and the second charging interface 51 can automatically reach a preset engagement angle with the aid of the photographing device 33, so as to ensure reliable connection and improve charging reliability. FIG. 11 shows a schematic diagram of the first charging interface 31 and the second charging interface 51 after engagement for charging.

Still referring to FIG. 10, the charging pile 30 further includes a base 35 arranged below the first charging interface 31, teeth 351 being provided on at least part of an outer periphery of the base 35. The telescoping sleeve 381 can be connected between the base 35 and the first charging interface 31. The rotation adjustment mechanism 39 includes power component 391 and a gear 392. The power component 391 and the gear 392 are arranged at an outer side of the base 35; the gear 392 is engaged with the teeth 351 of the base 35; the power component 391 is configured to drive the gear 392 to rotate the base 35 and the first charging interface 31; for example, the power component 391 can be an electric machine or motor, or the like.

In this embodiment, the gear 392 can be driven by the power component 391 to rotate, thereby causing the base 35 to rotate, and then causing the telescopic sleeve and the first charging interface 31 above to rotate as a whole. This structure is relatively simple, and can achieve precise adjustment of the engagement angle of the first charging interface 31.

Secondly, the present disclosure also provides a loading and unloading system, which in some embodiments includes: a logistics vehicle 50 provided with a battery 52 thereon, wherein the battery 52 can be arranged in a middle area longitudinally of a vehicle frame 53; and the loading and unloading platform for a new energy logistics vehicle of the above embodiment, which is configured to charge the battery 52 and to load and unload the logistics vehicle 50, and specifically can load and unload the logistics vehicle by a platform main body 11 and charge the battery 52 by a charging apparatus.

In the loading and unloading system of this embodiment, by combining the loading and unloading platform 10 and the charging apparatus, the logistics vehicle 50 can perform loading and unloading during charging, thereby greatly reducing the total operating time of a loading and unloading process, which can improve the time utilization ratio of the logistics vehicle and reduce waiting time, can save the total time spent on loading and unloading, and can also reduce the length of time the logistics vehicle occupies a space.

In some embodiments, the charging pile 30 includes a first sensing component 34, and the logistics vehicle 50 is provided with a second charging interface 51 and a second sensing component, the second charging interface 51 being located at the bottom of a rear area of a vehicle body; and the first sensing component 34 is configured to identify the second sensing component and can be arranged around the second charging interface 51, so as to read at least one of a model, positioning information and a height position of the second charging interface 51 of the logistics vehicle 50.

The working principle of the loading and unloading work system of the present disclosure will be described below in conjunction with FIGS. 1 to 11.

1. As shown in FIG. 4, when loading or unloading is needed, the logistics vehicle 50, guided by the guide lines 14, is reversed to the parking platform 12, and the movement of the logistics vehicle 50 is stopped when the rear part of the compartment touches the anti-collision components 13.
2. If docking in place is determined, the protective cover 32 is opened to get ready for charging, and the charging pile 30 is started to get ready for charging.
3. The photographing device 33 performs photographing upward to obtain an image, and the controller analyzes the image to obtain the docking in place of the logistics vehicle 50 and the positioning of the second charging interface 51 after the logistics vehicle 50 is docked in place. Further, the second sensing component on the logistics vehicle is identified by the first sensing component 34 to read information from a trip computer, including at least one of a model, positioning information and height information of the second charging interface 51 of the logistics vehicle 50.
4. The transverse position of the first charging interface 31 is adjusted by double positioning according to the image obtained by the photographing device 33 and the positioning information of the second charging interface 51 obtained by the first sensing component 34, to align the first charging interface 31 with the second charging interface 51 by moving transversely and longitudinally in a horizontal plane, and the position can be finely adjusted by the image obtained by the photographing device 33 during engagement.
5. The height of the first charging interface 31 is adjusted according to height information of the second charging interface 51 obtained by the first sensing component 34, and the first charging interface 31 is raised, by means of the height adjustment mechanism 38, to a height position returned by the trip computer, and fine adjustment is performed, during engagement, based on a first mark 311 obtained by the photographing device 33. Further, during engagement, the first charging interface 31 is rotated by the rotation adjustment mechanism 39 until an angle of engagement with the second charging interface 51 is reached.
6. After engagement is completed, the charging pile 30 is started for charging.
7. After charging is completed and stopped manually, the first charging interface 31 is lowered and separated from the second charging interface 51 by the height adjustment mechanism 38 until it is lowered to the initial position, and the protective cover 32 is closed.
8. The logistics vehicle 50 can perform a loading and unloading operation during charging, and the logistics vehicle 50 can be driven away from the loading and unloading platform 10 after loading and unloading and charging are completed.

A loading and unloading platform for a new energy logistics vehicle and a loading and unloading system provided in the present disclosure are described above in detail. Specific embodiments are used herein to illustrate the principles and implementations of the present disclosure, and the description of the above embodiments are only used to help understand the method of the present disclosure and its core idea. It should be noted that to those of ordinary skill in the art, a number of improvements and modifications may also be made for the present disclosure without departing from the principles of the present disclosure, and these improvements and modifications also fall within the protection scope of the claims of present disclosure.

The invention claimed is:

1. A loading and unloading platform for a new energy logistics vehicle, comprising:

a loading and unloading platform, comprising a platform main body, an accommodating chamber being arranged within the platform main body, and a loading and unloading docking area being provided at a side of the platform main body, wherein a height of the platform main body is the same as a height of a bottom of a compartment of the logistics vehicle, so that an item placed on the platform main body can be loaded into the compartment of the logistics vehicle, or the item in the compartment can be unloaded onto the platform main body; and a charging apparatus, comprising a charging host and a charging pile, the charging host being arranged within the accommodating chamber, the charging pile being arranged in the loading and unloading docking area, and the charging pile being configured to be electrically connected with the logistics vehicle to charge the same when the logistics vehicle is located in the loading and unloading docking area.

2. The loading and unloading platform for a new energy logistics vehicle according to claim 1, wherein the accommodating chamber has an opening for picking up and placing the charging host, the opening being oriented towards the charging pile.

3. The loading and unloading platform for a new energy logistics vehicle according to claim 2, further comprising a heat dissipation window, the heat dissipation window at least partially covering the opening, and the heat dissipation window being provided with a vent.

4. The loading and unloading platform for a new energy logistics vehicle according to claim 2, further comprising at least two anti-collision components, which are arranged on a side of the platform main body facing the loading and unloading docking area and are located on two sides transversely of the opening, respectively.

5. The loading and unloading platform for a new energy logistics vehicle according to claim 1, wherein the loading and unloading platform further comprises a parking platform, the parking platform being located on a side of the platform main body, the loading and unloading docking area being located on the parking platform, the charging pile being arranged on the parking platform and adjacent to the platform main body.

6. The loading and unloading platform for a new energy logistics vehicle according to claim 5, wherein guide lines are arranged on two sides transversely of the loading and unloading docking area of the parking platform to provide parking guidance to the logistics vehicle.

7. The loading and unloading platform for a new energy logistics vehicle according to claim 1, wherein the charging pile comprises: a first charging interface and a protective cover, the protective cover being configured to be in an open state when the logistics vehicle being charged and in a closed state after charging is completed.

8. The loading and unloading platform for a new energy logistics vehicle according to claim 1, wherein the charging pile further comprises: a photographing device configured to photograph a vehicle body image of the logistics vehicle; and the loading and unloading platform for a new energy logistics vehicle further comprises a controller, which is electrically connected to the photographing device and configured to analyze the image photographed by the photographing device, and identify docking in place of the logistics vehicle and positioning of a second charging interface of the logistics vehicle.

9. The loading and unloading platform for a new energy logistics vehicle according to claim 1, wherein the charging pile comprises: a first sensing component configured to identify a second sensing component on the logistics vehicle to read at least one of a model, positioning information and a height position of a second charging interface of the logistics vehicle.

10. The loading and unloading platform for a new energy logistics vehicle according to claim 1, wherein the charging pile comprises: a first charging interface, a first position adjustment mechanism and a second position adjustment mechanism, the first position adjustment mechanism and the second position adjustment mechanism being configured to adjust a transverse position and a longitudinal position, in a horizontal plane, of the first charging interface, respectively, so that the first charging interface is aligned in the horizontal plane with a second charging interface of the logistics vehicle.

11. The loading and unloading platform for a new energy logistics vehicle according to claim 10, wherein the first position adjustment mechanism comprises: a first slide rail, a first power component and a first drive wheel, the first slide rail being arranged transversely, and the first power component being configured to drive the first drive wheel to roll along the first slide rail, so that the first charging interface moves transversely; and/or the second position adjustment mechanism comprises: a second slide rail, a second power component and a second drive wheel, the second slide rail being arranged longitudinally, and the second power component being configured to drive the second drive wheel to roll along the second slide rail, so that the second charging interface moves longitudinally.

12. The loading and unloading platform for a new energy logistics vehicle according to claim 1, wherein the charging pile comprises: a first charging interface and a height adjustment mechanism, the height adjustment mechanism being configured to adjust the height of the first charging interface, so that when charging is needed, the first charging interface ascends to a height where the second charging interface of the logistics vehicle is located and comes into engagement with the second charging interface, and after charging is completed, the first charging interface descends and retracts.

13. The loading and unloading platform for a new energy logistics vehicle according to claim 12, wherein the height adjustment mechanism comprises a vertically arranged telescopic sleeve and a linear drive component, the linear drive component being configured to drive a topmost sleeve of the telescopic sleeve to ascend and descend, and the first charging interface being arranged on the topmost sleeve.

14. The loading and unloading platform for a new energy logistics vehicle according to claim 12, wherein the charging pile further comprises a photographing device configured to photograph engagement of the first charging interface;

the first charging interface is provided with a first mark configured to mark an engagement depth of the first charging interface; and the height adjustment mechanism is configured to adjust the height of the first charging interface according to the image acquired by the photographing device, so that the engagement depth reaches the first mark.

15. The loading and unloading platform for a new energy logistics vehicle according to claim 1, wherein the charging pile comprises: a first charging interface, a photographing device and a rotation adjustment mechanism;

the first charging interface is provided with a second mark configured to mark an engagement angle of the first charging interface; the photographing device is configured to photograph engagement of the first charging interface; and the rotation adjustment mechanism is configured to rotate the first charging interface so that the engagement angle reaches the second mark.

16. The loading and unloading platform for a new energy logistics vehicle according to claim 15, wherein the charging pile further comprises a base arranged below the first charging interface, teeth being provided on at least part of an outer periphery of the base, and the rotation adjustment mechanism comprises a power component and a gear, the gear being engaged with the teeth of the base, and the power component being configured to drive the gear to rotate the base and the first charging interface.

17. A loading and unloading system, comprising:

a logistics vehicle with a battery thereon; and the loading and unloading platform for a new energy logistics vehicle of claim 1, configured to charge the battery and to load and unload the logistics vehicle.

18. The loading and unloading system according to claim 17, wherein the logistics vehicle is provided with a second charging interface and a second sensing component, the second charging interface being located at the bottom of a rear area of a vehicle body; and wherein the charging pile comprises a first sensing component configured to identify the second sensing component, so as to read at least one of a model, positioning information and a height position of the second charging interface of the logistics vehicle.

* * * * *